United States Patent [19]

Rijckaert

[11] Patent Number: 4,597,023

[45] Date of Patent: Jun. 24, 1986

[54] SYSTEM FOR TRANSMITTING SIGNALS VIA A RECORD CARRRIER IN THE FORM OF A TAPE

[75] Inventor: Albert M. A. Rijckaert, Eindhoven, Netherlands

[73] Assignee: U.S. Philips Corporation, New York, N.Y.

[21] Appl. No.: 705,768

[22] Filed: Feb. 26, 1985

[30] Foreign Application Priority Data

Feb. 27, 1984 [NL] Netherlands .......................... 8400593

[51] Int. Cl.⁴ ............................................... G11B 5/56
[52] U.S. Cl. ....................................................... 360/77
[58] Field of Search ........................................... 360/77

[56] References Cited

U.S. PATENT DOCUMENTS 4,165,523  8/1979  Hathaway ............................. 360/77
4,482,928 11/1984  Moriya et al. ........................ 360/77
4,497,000  1/1985  Terada et al. ........................ 360/70

Primary Examiner—George G. Stellar
Attorney, Agent, or Firm—Thomas A. Briody; William J. Streeter; Edward W. Goodman

[57] ABSTRACT

A helical-scan recorder for two-channel digital video recording comprises two pairs of write-read heads which are situated diametrically opposite each other. To simplify tracking it is proposed to record tracking, signals of different frequencies with one head of each of said pairs of heads and to read said tracking signals during recording via crosstalk, each time using the other head of each of said pairs of heads.

9 Claims, 3 Drawing Figures

SYSTEM FOR TRANSMITTING SIGNALS VIA A RECORD CARRRIER IN THE FORM OF A TAPE

BACKGROUND OF THE INVENTION

The invention relates to a system for transmitting signals via a record carrier in the form of a tape, on which said signals are, or have been, recorded in mutually parallel tracks, which are inclined relative to the longitudinal axis of the record carrier, and which have a nominal pitch d, by means of an apparatus comprising a rotary-head arrangement having two pairs of heads which are disposed substantially diametrically opposite one another.

The invention also relates to a recording apparatus for use in the system, which apparatus comprises a rotary-head arrangement having two pairs of heads which are disposed substantially diametrically opposite one another, and to a reproducing apparatus for use in the system, which reproducing apparatus comprises a rotary-head arrangement having two pairs of heads which are disposed substantially diametrically opposite one another.

Such a system may be employed inter alia for recording and reproducing video signals in digitized form. After having been subjected to sub-Nyquist sampling and redundancy-reduction techniques, video signals can be transmitted with a transmission rate of approximately 24 Megabits/second, which requires a bandwidth of 12 MHz. A conventional video recorder, for example, the V2000 type, has a bandwidth of approximately 6 MHz, so that it is possible to record and reproduce these digital video signals by recording and reading with two heads in parallel instead of just one head. In order to obtain a sufficiently long playing time, the track width must be minimized. Therefore, a form of tracking control as used in the V2000 system in the form of a track following system is indispensable.

SUMMARY OF THE INVENTION

The invention aims at providing a system of the type specified in the opening paragraph and a recording apparatus and a reproducing apparatus for use in the system, in which tracking control can be used.

To this end, the system in accordance with the invention is characterized in that one of the two pairs of heads comprises a first head and a second head which, when viewed in a direction transverse to the tracks, are situated at such a distance from each other that two tracks are recorded at a distance nd from each other substantially simultaneously, n being a positive or a negative odd integer, and the other of the two pairs of heads comprises a third head and a fourth head which, when viewed in a direction transverse to the tracks, are situated at such a distance from each other that two tracks are recorded at a distance nd from each other substantially simultaneously, one pair being so arranged relative to the other pair that the first head and the third head as well as the second head and the fourth head alternately record tracks which are situated at a distance $(2+m)d$ from each other, when the record carrier is driven at a nominal driving speed, m being a positive or negative quadruple, including zero, and the nominal driving speed of the record carrier being such that, for each revolution of the rotary-head arrangement, the record-carrier is moved over a distance occupied by four tracks, the first and the second head are together arranged on a first electromechanical transucer for moving said heads substantially in a direction transverse to the track direction, the third head and the fourth head are together arranged on a second electromecanical transducer for moving said heads substantially in a direction transverse to the track direction, during recording of signals a first signal of a first frequency is applied to the first head and a second signal of a second frequency to the third head, said first and said second frequency being so low that during read-out these signals produce cross-talk in heads which follow an adjacent track, and during reproduction, signals of a first and a second frequency are extraced from the signals read by the second head and the fourth head and are utilized for the generation of tracking signals for controlling the first and the second electromechanical transducer.

Since the first head and the third head record tracking signals (the first and second signals), a track pattern is obtained in which tracks containing tracking signals alternate with tracks without tracking signals. During playback the heads which read the tracks without tracking sigals read the crosstalk signals produced by the two long-wave tracking signals, thereby enabling tracking control. Thus, the track heights of both heads of each pair are controlled simultaneously because each pair of heads is arranged on one transducer. This method of tracking has various advantages compared with the tracking method with four frequencies as employed in, for example, the V2000 system, such as:

a simple design because only two frequencies are used, the likelihood of errors due to amplitude differences of the tracking signals is reduced, a reduced frequency dependence of those heads which read the tracking signals when such low frequencies are read via crosstalk, because these two heads read the same pair of frequencies, and the track which is followed by the head which reads the tracking frequencies from the adjacent tracks does not produce a comparatively strong tracking signal.

A recording apparatus for use in a system in accordance with the invention is characterized in that one of the two pairs of heads comprises a first head and a second head which, when viewed in a direction of transverse to tracks, are situated at such a distance from each other that two tracks are recorded at a distance nd from each other substantially simultaneously, n being a positive or a negative odd integer, and the other of the two pairs of heads comprises a third head and a fourth head which, when viewed in a direction transverse to the tracks, are situated at such a distance from each other that two tracks are recorded at distance nd from each other substantially simultaneously, one pair of heads being so arranged relative to the other pair of heads that the first head and the third head, as well as the second head, and the fourth head alternately record tracks which are situated at a distance $(2+m)d$ from each other at a nominal driving speed of the record carrier, m being a positive or a negative quadruple, including zero, and the nominal driving speed of the record carrier being such that, for each revolution of the rotary head arrangement, the record-carrier is moved over a distance occupied by four tracks, there being further provided a frequency-generation circuit for generating a first signal of a first frequency and a second signal of a second frequency, said first and said second frequency being so low that during read-out, these signals produce crosstalk in the head which follows an adjacent track, and there being provided means for applying the first signal to the first head and the second signal to the third head; the reproducing apparatus for use in the system in accordance with the invention is characterized in that one of the two pairs of heads comprises a first head and a second head which, when viewed in a direction transverse to the tracks, are situated at such a distance from each other that two tracks are recorded at a distance and from each other substantially simultaneously, n being a positive or negative odd integer, and the other of the two pairs of heads comprises a third head and a fourth head which, when viewed in a direction transverse to the tracks, are situated at such a distance from each other that two tracks are recorded at a distance from each other that two tracks are recorded at a distance and from each other substantially simultaneously, one pair of heads being so arranged relative to the other pair of heads that the first and third head, as well as the second and the fourth head, alternately record tracks which are situated at a distance (2+m)d from each other at a nominal driving speed of the record carrier, m being a positive or negative quadruple, including zero, and the nominal driving speed of the record carrier being such that, for each revolution of the rotary-head arrangement, the record carrier is moved over a distance occupied by four tracks, the first head and the second head are together arranged on a first electromechanical transducer for moving said heads substantially in a direction transverse to the track direction, the third head and the fourth head are together arranged on a second electromechanical transducer for moving said heads substantially in a direction transvers to the track direction, and there are provided means for extracting signals of a first and second frequently from the signals read by the second and the fourth head and means for deriving tracking-error signals from said extraced signals for controlling the first and the second electromechanical transducer.

Preferably, the system and the recording and the reproducing apparatus embodying the invention are characterized further in that n=1 and m=0.

In accordance with a further characteristic feature, the second head and the fourth head are situated after the first head and the third head, when respectively, viewed in the direction in which the record carrier is driven.

This has the advantage that the heads, which should read the tracking signals, during recording, write tracks which are situated directly adjacent tracks which have already been recorded and which contain tracking signals, so that, in principle, head-height control is possible during recording by monitoring the amplitude of the tracking signal produced by crosstalk from the track already recorded.

DESCRIPTION OF THE DRAWING

The invention will now be described in more detail by way of example, with reference to the accompanying drawing, in which.

DESCRIPTION OF THE PREFERRED EMBODIMENT

Figure 1:
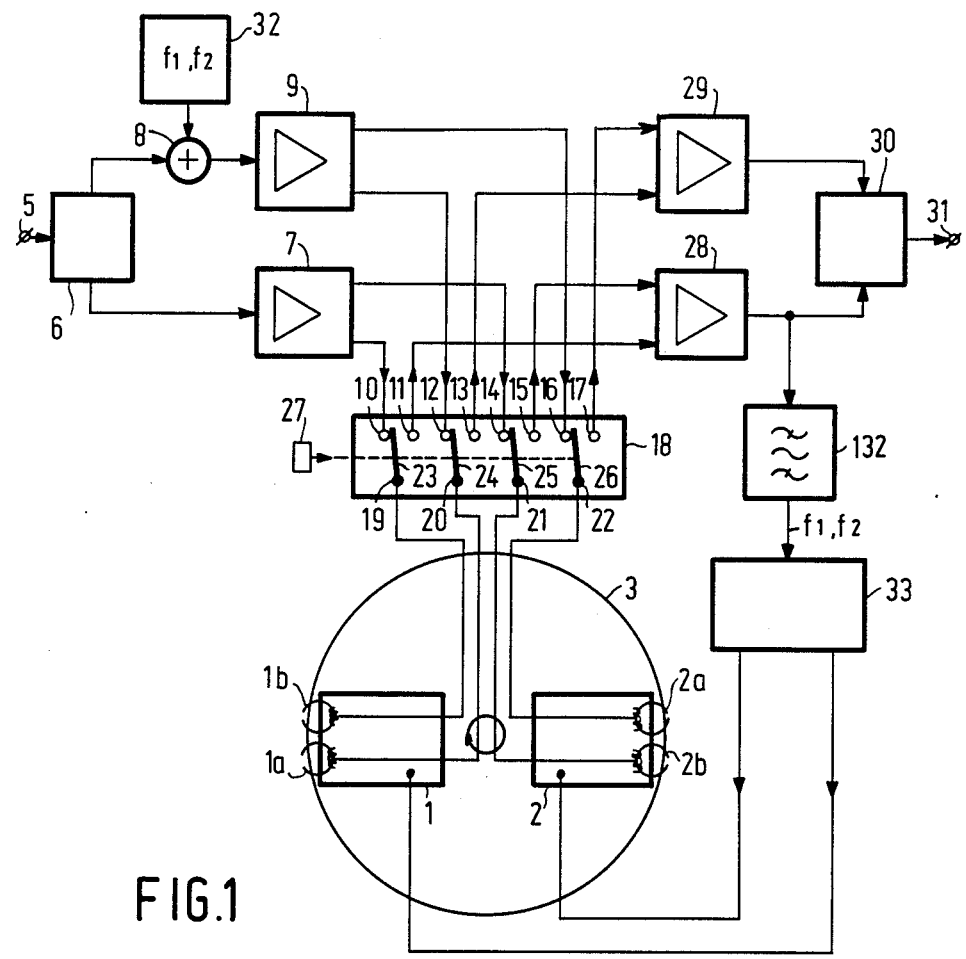
FIG. 1 shows a combined recording/reproducing apparatus for use in a system in accordance with the invention.

The apparatus shown in FIG. 1 comprises a rotary support 3, referred to as a head disc, carrying two transducers 1 and 2. These transducers 1, 2 are, for example, bimorphous piezo-electric elements. Two heads 1a and 1b are arranged on the transducer 1 and two heads 2a and 2b are arranged on the opposite transducer 2. In known manner, not shown, the head disc is arranged in a head drum around which a magnetic tape is moved along a helical path of 180° in conformity with the wall-known helical-scan principle. In this way, the head pair 1a and 1b and the head pair 2a and 2b are alternately in magnetic contact with the magnetic tape to write one pair of tracks every time.

The apparatus comprises a video-signal input 5, which is connected to a video-signal processor 6 in which the video signal is digitized and split into two channels, for example, by splitting the frequency spectrum of the video signal or by separating the digital samples. One channel is connected to a recording amplifier 7 and the other is connected to a recording amplifier 9 via an adder 8.

The apparatus further comprises a record/playback switch 18, which in the present example is represented by mechanical switches 23, 24, 25 and 26. Switch 23 selectably connects a point 19 to a point 10 or 11, switch 24 connects a point 20 to a point 12 or 13, switch 25 connects a point 21 to a point 14 or 15, and switch 26 connects a point 22 to a point 16 or 17, respectively. Points 19, 20, 21 and 22 are connected to the heads 1b, 1a, 2b and 2a, respectively, for example via a four-channel rotary transformer, not shown. Points 10 and 14 receive the same signal from the recording amplifier 7 and points 12 and 16 receive the same signal from the recording amplifier 9, so that in the shown position of the switch 18, heads 1a and 2a alternately record the signal supplied by the amplifier 9 on the magnetic tape and the heads 1b and 2b alternately record the signal supplied by the recording amplifier 7 on the magnetic tape.

Points 11 and 15 of switch 18 are connected to a playback amplifier 28, while points 13 and 17 are connected to a playback amplifier 29. If switch 18 is set to the position not shown ("play" position) using a control 27, the playback amplifier 28 alternately receives the signals produced by the heads 1b and 2b and the playback amplifier 29 alternately receives the signals read by the heads 1a and 2a. The output signals of the read amplifiers 28 and 29 are recombined in a video-signal processor 30 and converted into an analog video signal on output 31.

For the purpose of tracking, signals, which alternately have a frequency f1 and f2 after every 180° rotation of the head disc 3, are applied to the recording amplifier 9 via the adder 8, so that in addition to the relevant digitized video signal, a signal of the frequency f1 is applied to head 1a and a signal of the frequency f2 to head 2a during recording. During playback, the crosstalk produced by these signals in the adjacent tracks is read by heads 1b and 2b, the frequencies f1 and f2 being sufficiently low as to produce crosstalk. The tracking signals thus read are extracted by a filter 132 coupled to the output of playback amplifier 28 and are applied to a tracking-error signal generator 33, which derives control signals for the transducers 1 and 2 from said extracted signals, for example in the same way as the tracking-error signal generator used in the V2000 video-recorder system, but each time with the same pair of frequencies instead of alternately one of two pairs of frequencies (for the known tracking system reference is made to inter alia Netherlands Patent Application No. 7812286=PHN.9305).

Figures 2A, 2B:
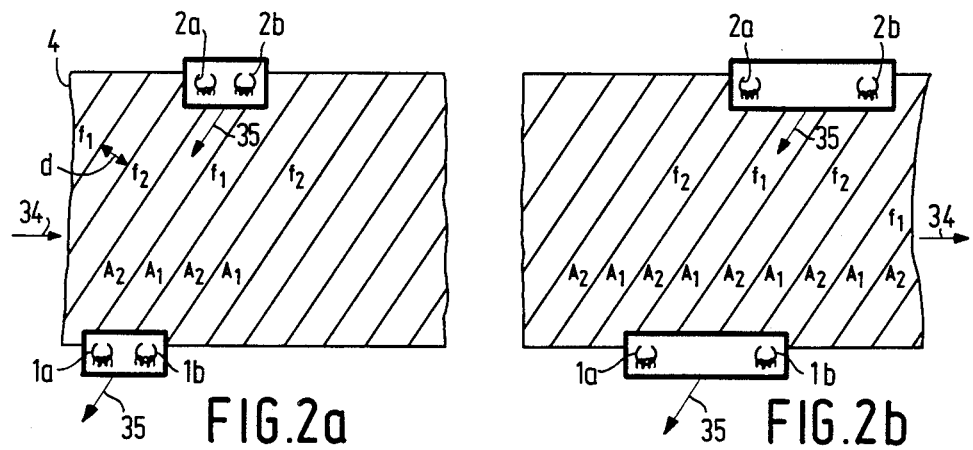
FIGS. 2a and 2b show, schematically, the track pattern recorded on a record carrier by means of the system in accordance with the invention.

FIG. 2a shows schematically the positions of the various heads relative to the magnetic tape 4, the arrow 34 denoting the tape-transport direction and the arrows 35 the direction of movement of the heads. On this magnetic tape, oblique tracks are written with a track width (=pitch) d. The heads 1a and 1b, as well as the heads 2a and 2b, are so arranged relative to each other that they record adjoining tracks, while the position of one set relative to the other set is such that the head 2b records a track which adjoins the track written by head 1a (and head 1b track which adjoins the track written by head 2a one-half revolution later). Thus, an adjoining pattern of tracks is recorded, which tracks alternately contain and do not contain tracking signals, the frequencies of these tracking signals constantly alternating between f1 and f2. During playback, the head 1b always reads a signal of the frequecny f1 from the adjacent track situated on one side and a signal of the frequency f2 from the adjacent track situated on the other side, while for head 2b, the situation with respect to the frequencies of these signals is exactly the other way around.

In principle, the heads 2a, 2b and the heads 1a, 1b need not record adjoining tracks. In the same way as FIG. 2a, FIG. 2b represents the situation in which the heads 2a, 2b and the heads 1a, 1b are situated three tracks apart. Alternatively, the two head sets may be situated several tracks apart. The heads 1a, 1b and 2a, 2b should be situated at a distance nd from each other, n being a positive or negative odd integer and the two sets of heads should be situated at a distance (2+m)d from each other, m being a quadruple including zero. For the situation shown in FIG. 2a n=1 and m=0 and for the situation shown in FIG. 2b n=3 and m=0.

During recording in the situation shown, those heads which do not record a tracking signal, record tracks, adjacent tracks already being recorded, so that these heads enable the tracking signal in the adjacent track just recorded to be read and to be employed for tracking during recording, for example using the principle employed in the V2000 system as described in inter alia Netherlands Patent Application No. 7801318 (PHN.9043).

For crosstalk reduction, it is known to arrange the heads in such a way that the head gaps are inclined relative to each other, so that the tracks are alternately recorded at one of the two azimuth angles $A_1$ and $A_2$. This may also be employed in the apparatus in accordance with the invention by giving the heads 1a and 2a and azimuth $A_1$ and the heads 1b and 2b and azimuth $A_2$.

In comparison with a tracking principle as used in the V2000 system, the tracking method described above has several advantages, which mainly stem from the fact that the proposed principle utilizes only two different frequencies. The advantages are inter alia that the apparatus is less intricate, that there is a reduced likelihood of errors due to amplitude differences between the tracking signals, and that the frequency-dependence of the read-out of said tracking signals does not give rise to errors because always the same pair of signals is read (only the situation is always mirror-inverted), which yields the possibility to ensure that the correct set of the two heads 1a, 1b and 2a, 2b follows the correct set of tracks.

What is claimed is:

1. A system for transmitting signals via a record carrier in the form of a tape, on which said signals are, or have been, recorded in mutually parallel tracks which are inclined relative to the longitudinal axis of the record carrier and which have a nominal pitch d, by means of an apparatus which comprises a rotary-head arrangement having two pairs of heads which are disposed substantially diametrically opposite one another, characterized in that one of the two pairs of heads comprises a first head and a second head which, when viewed in a direction transverse to the tracks, are situated at such a distance from each other that two tracks are recorded at a distance nd from each other substantially simultaneously, n being a positive or negative odd integer, and the other of the two pairs of heads comprises a third head and a fourth head which, when viewed in a direction transverse to the tracks, are situated at such a distance form each other that two tracks are recorded at a distance nd from each other substantially simultaneously, one pair of heads being so arranged relative to the other pair of heads that the first head and the third head, as well as the second head and the fourth head, alternately record tracks which are situated at a distance (2+m)d from each other when the record carrier is driven at a nominal driving speed, m being a positive or negative quadruple, including zero, and the nominal driving speed of the record carrier being such that for each revolution of the rotary-head arrangement, the record carrier is moved over a distance occupied by four tracks, the first head and the second head are together arranged on a first electromechanical tranducer for moving said heads substantially in a direction transverse to the track direction, the third head and the fourth head are together arranged on a second electromechanical transducer for moving said heads substantially in a direction transverse to the track direction, during recording of signals, a first signal of a first frequency is applied to the first head and a second signal of a second frequency is applied to the third head, said first and said second frequency being so low that during read-out, these signals produce crosstalk in heads which follow an adjacent track, and during reproduction, signals of the first frequency and the second frequency are extracted from the signals read by the second head and the fourth head and are utilized for the generation of tracking signals for controlling the first and the second electromechanical transducers.

2. A system as claimed in claim 1, characterized in that n=1 and m=0.

3. A system as claimed in claim 2, characterized in that the second head and the fourth head are situated after the first head and the third head, respectively, when viewed in the direction in which the record carrier is driven.

4. A recording apparatus for use in a system as claimed in claim 1, comprising a rotary-head arrangement having two pairs of heads which are situated substantially diametrically opposite each other, characterized in that one of the two pairs of heads comprises a first and a second head which, when viewed in a direction transverse to the tracks, are situated at such a distance from each other that two tracks are recorded at a distance nd from each other substantially simultaneously, n being a positive or negative odd integer, and the other of the two pairs of heads comprises a third head and a fourth head which, when viewed in a direction transverse to the tracks, are situated at such a distance from each other than two tracks are recorded at the distance nd from each other substantially simultaneously, one pair of heads being so arranged relative to the other pair of heads that the first head and the third head, as well as the second head and the fourth head, alternately record tracks which are situated at a distance $(2+m)d$ from each other at a nominal driving speed of the record carrier, m being a positive or negative quadruple, including zero, and the nominal driving speed of the record carrier being such that for each revolution of the rotary-head arrangement, the record carrier is moved over a distance occupied by four tracks, there being provided a frequency-generation circuit for generating a first signal of a first frequency and a second signal of a second frequency, said first frequency and said second frequency being so low that during read-out, these signals produce crosstalk in the heads which follow an adjacent track, and there being provided means for applying the first signal to the first head and the second signal to the third head.

5. A recording apparatus as claimed in claim 4, characterized in that $n=1$ and $m=0$.

6. A recording apparatus as claimed in claim 5, characterized in that the second head and the fourth head are situated after the first head and the third head, respectively, when viewed in the direction in which the record carrier is driven.

7. A reproducing apparatus for use in a system as claimed in claim 1, comprising a rotary-head arrangement having two pairs of heads which are situated substantially diametrically opposite each other, characterized in that one of the two pairs of heads comprises a first head and a second head which, when viewed in a direction transverse to the tracks, are situated at such a distance from each other that two tracks are read at a distance nd from each other substantially simultaneously, n being a positive or a negative odd integer, and the other of the two pairs of heads comprises a third head and a fourth head which, when viewed in a direction transverse to the tracks, are situated at such a distance from each other that two tracks are read at a distance nd from each other substantially simultaneously, one pair of heads being so arranged relative to the other pair of heads that the first head and the third head, as well as the second head and the fourth head, alternately read tracks which are situated at a distance $(2+m)d$ from each other at a nominal driving speed of the record carrier, m being a positive or negative quadruple, including zero, and the nominal driving speed of the record carrier being such that for each revolution of the rotary-head arrangement, the record carrier is moved over a distance occupied by four tracks, the first head and the second head are together arranged on a first electro-mechanical transducer for moving said heads substantially in a direction transverse to the track direction, the third head and the fourth head are together arranged on a second electromechanical transducer for moving said heads substantially in a direction transverse to the track direction, and there are provided means for extracting signals of a first and a second frequency from the signals read by the second head and the fourth head, and means for deriving tracking-error signals from said extracted signals for controlling the first and the second electromechanical transducer.

8. A reproducing apparatus as claimed in claim 7, characterized in that $n=1$ and $m=0$.

9. A reproducing apparatus as claimed in claim 8, characterized in that the second head and the fourth head are situated after the first head and the third head, respectively, when viewed in the direction in which the record carrier is driven.

* * * * *